(12) United States Patent
Nguyen et al.

(10) Patent No.: US 9,321,956 B2
(45) Date of Patent: Apr. 26, 2016

(54) METHODS FOR HINDERING THE SETTLING OF PARTICULATES IN A SUBTERRANEAN FORMATION

(71) Applicant: Halliburton Energy Services, Inc., Houston, TX (US)

(72) Inventors: Philip D. Nguyen, Houston, TX (US); Loan K. Vo, Houston, TX (US); Tingji Tang, Spring, TX (US); B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 250 days.

(21) Appl. No.: 14/040,879

(22) Filed: Sep. 30, 2013

(65) Prior Publication Data
US 2014/0144639 A1 May 29, 2014

Related U.S. Application Data

(63) Continuation-in-part of application No. 13/687,406, filed on Nov. 28, 2012.

(51) Int. Cl.
| | |
|---|---|
| *C09K 8/92* | (2006.01) |
| *E21B 43/267* | (2006.01) |
| *E21B 43/25* | (2006.01) |
| *C09K 8/56* | (2006.01) |
| *C09K 8/80* | (2006.01) |
| *C09K 8/57* | (2006.01) |

(52) U.S. Cl.
CPC ... *C09K 8/92* (2013.01); *C09K 8/56* (2013.01); *C09K 8/57* (2013.01); *C09K 8/80* (2013.01); *C09K 8/805* (2013.01); *E21B 43/25* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 2,285,843 | A | 6/1942 | Smith et al. |
| 3,980,136 | A | 9/1976 | Plummer et al. |
| 4,493,875 | A | 1/1985 | Beck et al. |
| 4,585,064 | A | 4/1986 | Graham et al. |
| 4,670,501 | A | 6/1987 | Dymond et al. |
| 5,249,627 | A | 10/1993 | Harms et al. |
| 5,439,059 | A | 8/1995 | Harris et al. |
| 5,833,000 | A | 11/1998 | Weaver et al. |
| 5,839,510 | A | 11/1998 | Weaver et al. |
| 5,853,048 | A | 12/1998 | Weaver et al. |
| 5,905,061 | A | 5/1999 | Patel |
| 5,977,031 | A | 11/1999 | Patel |
| 6,209,643 | B1 | 4/2001 | Nguyen et al. |
| 6,279,656 | B1 | 8/2001 | Sinclair et al. |

(Continued)

FOREIGN PATENT DOCUMENTS

| | | |
|---|---|---|
| WO | 2013033391 A1 | 3/2013 |
| WO | 2013078306 A1 | 5/2013 |

*Primary Examiner* — Erma Cameron
(74) *Attorney, Agent, or Firm* — McDermott Will & Emery LLP; Craig W. Roddy

(57) ABSTRACT

Embodiments herein include a method comprising proving a treatment fluid comprising an activator and providing gas-forming particulates comprising coating particulates with a binding agent, wherein the binding agent holds a gas-generating chemical onto the particulates. The gas-forming particulates are suspended in the treatment fluid and the treatment fluid comprising the gas-forming particulates is introduced into a subterranean formation. The gas-generating chemical and the activator then react to generate gas-formed particulates.

19 Claims, 1 Drawing Sheet

(56) References Cited

U.S. PATENT DOCUMENTS

| | | |
|---|---|---|
| 6,311,773 B1 | 11/2001 | Todd et al. |
| 6,439,309 B1 | 8/2002 | Matherly et al. |
| 6,488,091 B1 | 12/2002 | Weaver et al. |
| 6,582,819 B2 | 6/2003 | McDaniel et al. |
| 6,677,426 B2 | 1/2004 | Noro et al. |
| 6,715,553 B2 | 4/2004 | Reddy et al. |
| 6,722,434 B2 | 4/2004 | Reddy et al. |
| 6,828,279 B2 | 12/2004 | Patel et al. |
| 6,992,048 B2 | 1/2006 | Reddy et al. |
| 7,066,258 B2 | 6/2006 | Justus et al. |
| 7,119,083 B2 | 10/2006 | Bruns, Jr. et al. |
| 7,131,491 B2 | 11/2006 | Blauch et al. |
| 7,153,575 B2 | 12/2006 | Anderson et al. |
| 7,211,546 B2 | 5/2007 | Dobson, Jr. et al. |
| 7,216,705 B2 | 5/2007 | Saini et al. |
| 7,261,156 B2 | 8/2007 | Nguyen et al. |
| 7,350,579 B2 | 4/2008 | Gatlin et al. |
| 7,392,847 B2 | 7/2008 | Gatlin et al. |
| 7,407,010 B2 | 8/2008 | Rickman et al. |
| 7,534,745 B2 | 5/2009 | Taylor et al. |
| 7,581,590 B2 | 9/2009 | Lesko et al. |
| 7,595,391 B2 | 9/2009 | Norman et al. |
| 7,645,723 B2 | 1/2010 | Kirsner et al. |
| 7,673,686 B2 | 3/2010 | Nguyen et al. |
| 7,696,131 B2 | 4/2010 | Oyler et al. |
| 7,845,409 B2 | 12/2010 | Shinbach et al. |
| 7,900,702 B2 | 3/2011 | Reddy et al. |
| 7,918,227 B1 | 4/2011 | Phythyon |
| 7,956,017 B2 | 6/2011 | Gatlin et al. |
| 8,058,213 B2 | 11/2011 | Rediger et al. |
| 8,076,271 B2 | 12/2011 | Blauch et al. |
| 8,448,706 B2 | 5/2013 | Hughes et al. |
| 2003/0221831 A1 | 12/2003 | Reddy et al. |
| 2004/0110643 A1 | 6/2004 | Zevallos |
| 2005/0126781 A1 | 6/2005 | Reddy et al. |
| 2005/0274517 A1 | 12/2005 | Blauch et al. |
| 2005/0277554 A1 | 12/2005 | Blauch et al. |
| 2007/0034378 A1* | 2/2007 | Welton .................. C09K 8/703 166/308.6 |
| 2007/0131422 A1 | 6/2007 | Gatlin et al. |
| 2007/0131425 A1 | 6/2007 | Gatlin et al. |
| 2008/0006405 A1 | 1/2008 | Rickman et al. |
| 2008/0135246 A1 | 6/2008 | Canova et al. |
| 2009/0275488 A1 | 11/2009 | Zamora et al. |
| 2009/0298720 A1* | 12/2009 | Nguyen .................. C09K 8/74 507/204 |
| 2010/0065274 A1 | 3/2010 | Haney et al. |
| 2010/0179281 A1 | 7/2010 | Nilsen |
| 2010/0212898 A1 | 8/2010 | Nguyen et al. |
| 2010/0252262 A1 | 10/2010 | Ekstrand et al. |
| 2010/0280210 A1 | 11/2010 | Kitamura et al. |
| 2011/0098394 A1 | 4/2011 | Schmeltzer et al. |
| 2011/0120719 A1 | 5/2011 | Soane et al. |
| 2012/0048555 A1 | 3/2012 | Hughes et al. |
| 2012/0055593 A1 | 3/2012 | Kobayashi |
| 2012/0207843 A1 | 8/2012 | Lebon et al. |
| 2012/0227967 A1 | 9/2012 | Shaikh et al. |
| 2013/0068469 A1 | 3/2013 | Lin et al. |
| 2013/0237461 A1 | 9/2013 | Hughes et al. |
| 2014/0131042 A1* | 5/2014 | Nguyen .................. C09K 8/80 166/280.2 |
| 2014/0144629 A1 | 5/2014 | Nguyen |

\* cited by examiner

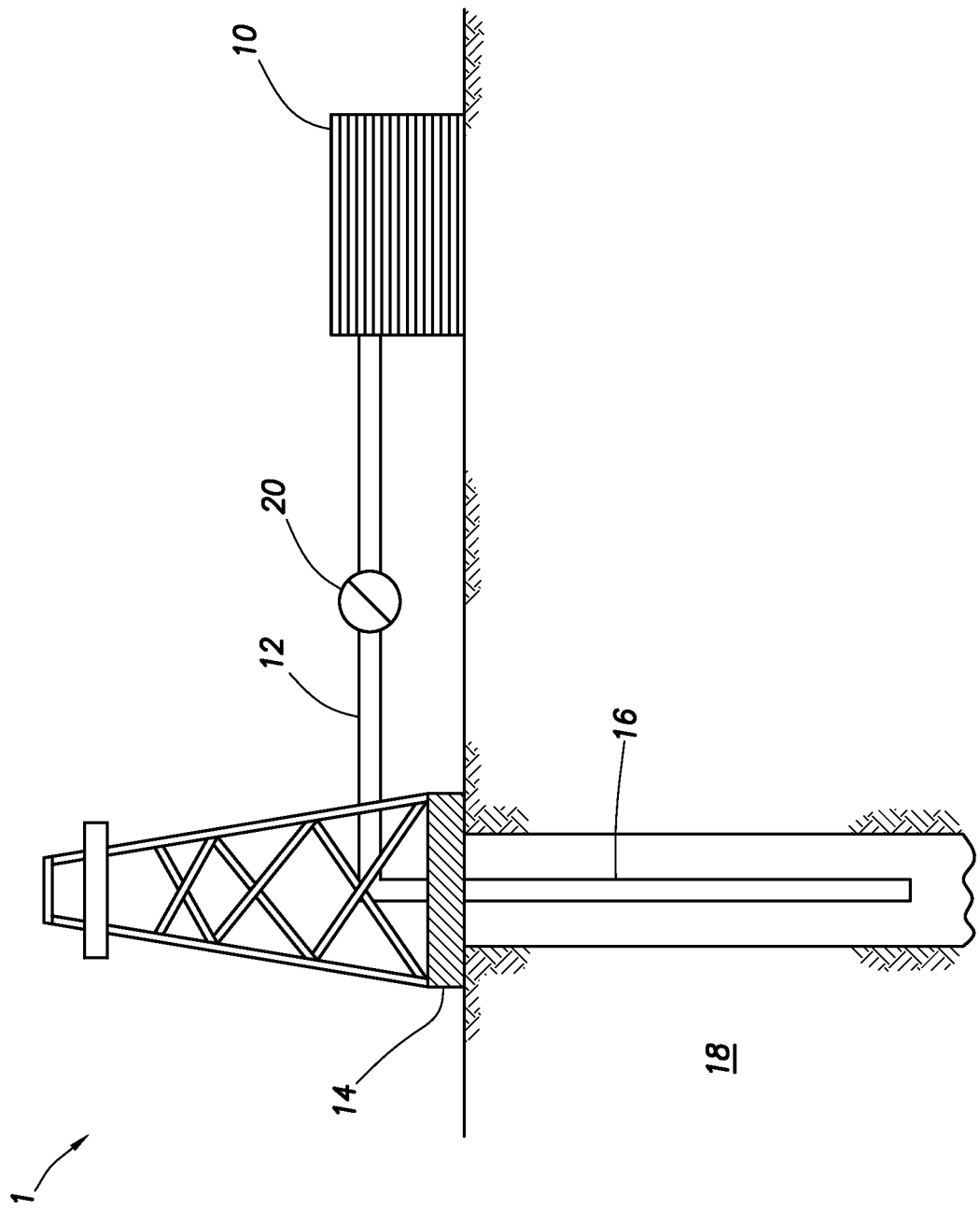

METHODS FOR HINDERING THE SETTLING OF PARTICULATES IN A SUBTERRANEAN FORMATION

CROSS-REFERENCE TO RELATED APPLICATIONS

This application is a continuation-in-part of U.S. patent application Ser. No. 13/687,406, filed on Nov. 28, 2012.

BACKGROUND

The embodiments herein relate to methods for hindering the settling of particulates in a subterranean formation.

Subterranean wells (e.g., hydrocarbon producing wells, water producing wells, and injection wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation to create or enhance at least one fracture therein. "Proppant" or "proppant particulates" (e.g., graded sand, bauxite, ceramic, nut hulls, and the like) are typically suspended in a treatment fluid and deposited into the fracture(s) while maintaining pressure above the fracture gradient. The proppant particulates are generally deposited in the fracture(s) in a concentration sufficient to form a pack of proppant particulates, or a "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

A known alternative hydraulic fracturing treatment involves placing a reduced volume of proppant particulates in a fracture to create a more conductive fracture. In such treatments, individual proppant particulates are formed into proppant aggregates. As used herein, the term "proppant aggregate" refers to a coherent body of any proppant particulates, such that the proppant aggregate does not tend to disperse into smaller bodies without the application of shear. The proppant aggregates may be placed into the fracture(s) in a spaced apart fashion, to form proppant pillars capable of maintaining sufficient integrity to hold open the fracture once the hydraulic pressure is removed and allow for the flow of produced fluids. The individual proppant pillars exist apart from the other proppant pillars, rather than forming a traditional proppant bed wherein each proppant particulate is nestled against neighboring proppant particulates. In this way, there is more space between the pillars for fluids to flow, rather than only being able to flow between the interstitial spaces of neighboring particles in a traditional bed. As used herein, the term "proppant" or "proppant particulates," in all of its forms is intended to encompass proppant aggregates.

During hydraulic fracturing, other particulates may be suspended within the treatment fluid (e.g., weighting agents, bridging materials, and the like). These particulates are included in the treatment fluid to ensure that the treatment fluid is adequate to perform its given function and may vary depending on, for example, the conditions of the subterranean formation. As used herein, the term "particulate" is collectively used to refer to these particulates, as well as proppant particulates and proppant aggregates.

The specific gravity of particulates used in a subterranean operation may be high in relation to the treatment fluids in which they are suspended for transport and/or deposit in a fracture. As such, the particulates may settle out of the treatment fluids at any point during a subterranean operation. For example, the particulates may settle to the bottom of a wellbore or may form a heterogeneous gradient throughout the treatment fluids. Additionally, the particulates may settle out of the treatment fluid prior to reaching their intended target zone, thereby reducing their effectiveness in the treatment fluid. Proppant particulates may settle out of a treatment fluid toward the bottommost portion of the fracture, for example, resulting in complete or partial occlusion of the portion of the fracture where no proppant particulates have collected when the hydraulic pressure is removed (e.g., at the top of the fracture or a bottom portion of the fracture above a bottommost portion). Additionally, screenout may result, in which the particulates form a bridge across perforations or other restricted flow areas in a fracture resulting in fluid pathway blockage and prevention of fracture growth. As such, the productivity of a subterranean formation may be impaired due to settling of the particulates.

BRIEF DESCRIPTION OF THE DRAWINGS

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids comprising the gas-forming proppant particulates of the embodiments described herein to a down hole location.

DETAILED DESCRIPTION

The embodiments herein relate to methods for hindering the settling of particulates in a subterranean formation. More particularly, the embodiments herein relate to methods of treating subterranean formations with treatment fluids comprising a gas-generating mechanism. As used herein, the term "gas-generating mechanism" refers to any agent or combination of agents capable of adhering onto a particulate and generating gas thereon or associated therewith for use in a subterranean formation operation. The term includes any agent or combination of agents that may be included in the treatment fluid to aid in generating the gas on a particulate. That is, a gas-forming particulate having a gas-generating chemical adhered thereto and an activator in the treatment fluid to comprise a gas-generating mechanism or a gas-forming particulate having a gas-generating chemical and an activator adhered thereto to comprise a gas-generating mechanism, and the like. The term does not encompass the generation of gas in a treatment fluid to form a foamed treatment fluid.

The methods described herein hinder the settling of particulates in a treatment fluid by in situ gas generation. More specifically, in some embodiments, a gas-generating chemical may be adhered onto particulates and suspended in a treatment fluid comprising an activator, such that the gas-generating chemical and the activator react together to generate gas on or associated with the gas-forming particulates. In other embodiments, the activator may also be adhered to the particulates, separated by an encapsulating material. As used herein, the term "associated with the gas-forming particulates," in all of its variations, refers to the generation of gas sufficiently near the gas-forming particulates such that the gas is capable of at least partially decreasing the density of the gas-formed particulates within a treatment fluid. As used herein, the term "gas-formed particulates" refers to the particulates having the generated gas associated therewith such that the density of the particulate and gas combination is less than the density of the particulates before the gas is generated.

The gas generated by the reaction of the gas-generating chemicals and activators disclosed herein, formed on or associated with the gas-forming particulates, do not form foamed fluids. The gas is generated only on or near the gas-forming particulates so as to decrease the density of the particulates while suspended in a treatment fluid. The gas-forming mechanism described herein does not form a free gas phase in the treatment fluids and, thus, does not form foamed treatment fluids. However, the gas-generating mechanism disclosed herein may be used with foam treatment fluids, depending on the particular subterranean operation, though they are not themselves intended to cause the treatment fluid to foam.

Although some embodiments described herein are illustrated by reference to hydraulic stimulation treatments comprising gas-forming particulates that may serve as proppant particulates or proppant aggregates, the gas-forming particulates disclosed herein may be used in any subterranean formation operation that may benefit from the gas-generating mechanisms described herein. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the gas-forming proppant particulates described herein may be used in any non-subterranean operation that may benefit from their gas-forming properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method is provided comprising providing a treatment fluid comprising an activator and gas-forming particulates. The gas-forming particulates are formed by coating particulates with a binding agent, wherein the binding agent holds a gas-generating chemical onto the particulates. As used herein, the term "holds" refers the ability of a binding agent to grasp, carry, or support the gas-generating chemical on or within the binding agent. The gas-forming particulates are suspended in the treatment fluid comprising the activator and introduced into a subterranean formation. Therein, the gas-generating chemical and the activator react so as to generate a gas on or associated with the gas-forming particulates, thereby creating gas-formed particulates. In some embodiments, the gas-generating chemical may be contained within the binding agent prior to coating the binding agent onto the particulates. That is, the binding agent and the gas-generating chemical are pre-mixed.

The gas may be formed on or associated with the surface of the particulates, where the gas-generating chemical is adhered or embedded so as to reduce the density of the gas-formed particulates. That is, the gas-forming particulates may have a first density in the treatment fluid; however, upon reacting the gas-generating chemical and the activator, the density of the gas-formed particulates has a second, reduced density. Such reduction in density may reduce or eliminate the need for gelling agents in certain treatment fluids, or may synergistically operate with gelling agents, depending on the particular subterranean operation. In some embodiments, the gas generated from the reaction of the gas-generating chemical and the activator may reduce the density of the gas-formed particulates suspended in the treatment fluid by a lower limit of about 5%, 10%, 15%, 20%, 25%, 30%, 35%, 40%, and 45% to an upper limit of about 90%, 85%, 80%, 75%, 70%, 65%, 60%, 55%, 50%, and 45% of the initial density of the particulates. In some embodiments, it may be preferred that the gas generated from the reaction of the gas-generating chemical and the activator may reduce the density of the gas-formed particulates suspended in the treatment fluid in the range of about 30% to about 70%, and any value therebetween.

In some embodiments, the gas-forming particulates, coated with a binding agent holding or containing a gas-generating chemical, may be further encapsulated with an encapsulating material. In some embodiments, the encapsulated gas-forming particulates may be further coated with a second binding agent that holds the activator, rather than or in addition to having the activator in the treatment fluid. In some embodiments, the activator may be contained within the second binding agent prior to coating the second binding agent onto the encapsulated, gas-forming particulates. In still other embodiments, the second binding agent holding or containing the activator may be further encapsulated with a second encapsulating material. In yet other embodiments, the gas-generating chemical itself may be encapsulated prior to the gas-generating chemical being held on the gas-forming particulate by the binding agent or prior to mixing the gas-generating chemical and the binding agent for later placement on a particulate.

In those embodiments wherein the gas-forming particulates, coated with a binding agent holding or containing a gas-generating chemical, are suspended in a treatment fluid comprising an activator, the gas-generating chemical and the activator may react so as to generate gas by any mechanism that permits the gas-generating chemical and the activator to come into contact. In some embodiments, the gas-generating chemical and the activator come into contact by exposing the gas-generating chemical to the activator through the binding agent.

In those embodiments wherein the gas-forming particulates, coated with a binding agent holding or containing a gas-generating chemical, are encapsulated, and the treatment fluid comprises the activator, the gas-generating chemical and the activator may react to generate gas by any mechanism that permits the gas-generating chemical and the activator to come into contact. In some embodiments, the gas-generating chemical and the activator come into contact by exposing the gas-generating chemical to the activator through the encapsulating material. In other embodiments, the gas-generating chemical and the activator come into contact by exposing the gas-generating chemical to the activator through the encapsulating material and through the binding agent. In those embodiments wherein the gas-forming particulates, coated with a binding agent holding or containing a gas-generating chemical, are encapsulated, and thereafter coated with a second binding agent holding or containing an activator, the gas-generating chemical and the activator may react so as to generate gas by any mechanism that permits the gas-generating chemical and the activator to come into contact. In some embodiments, the gas-generating chemical and the activator come into contact by exposing the gas-generating chemical to the activator through the second binding agent and through the first encapsulating material. In other embodiments, the gas-generating chemical and the activator come into contact by exposing the gas-generating chemical and the activator through the second binding agent, through the first encapsulating material, and through the first binding agent. In those embodiments wherein the gas-generating chemical is itself encapsulated, the gas-generating chemical and the activator may come into contact by further exposing the gas-generating chemical to the activator through the encapsulating material surrounding the gas-generating chemical. The encapsulating material used to encapsulate the gas-generating chemical may be the same or different than that used to encapsulate the gas-forming particulates in their various forms (e.g., the first encapsulating material, the second encapsulating material, and the like), depending on the particular subterranean formation and the particular gas-forming properties desired (e.g., the time elapsed before gas formation), the particular activator selected, and the like.

As used herein, the term "through" as used in the terms "through the encapsulating material" and "through the binding agent" refers to any means that allows the activator to breach the encapsulating material and/or the binding agent and reach the gas-generating chemical. The gas-generating chemical may be exposed to the activator through the encapsulating material or through the binding agent by the activator diffusing therethrough; by forming a physical pathway for the activator to enter (e.g., by melting, breaking or cracking, degrading, and the like); and any combination thereof. In some embodiments, the first and/or encapsulating material may be completely removed from the gas-forming particulates. In other embodiments, a portion of the first and/or encapsulating material may remain affiliated with the gas-forming particulates.

In those embodiments where the activator diffuses through the first or second encapsulating material and/or the first or second binding agent, the gas may be generated within the encapsulating material so as to decrease the density of the gas-forming particulates. In other embodiments, the activator and the gas-generating chemical may react on or associated with the gas-forming particulate to generate gas and decrease the density of the gas-forming particulate in the treatment fluid. Therefore, the composition of the binding agents and/or encapsulating materials may be the same or may be different to achieve the mechanism desired for reacting the gas-generating chemical and the activator according to some embodiments described herein. For example, if the activator is to diffuse through the binding agent, such binding agent may be selected to have a porous structure or the ability to dissolve and move through the binding agent (e.g., from high concentration to low concentration).

When the gas-forming particulates or the gas-generating chemicals are encapsulated, such that the encapsulating material forms the outermost coating thereon, the embodiments herein permit storage of the gas-forming particulates or the gas-generating chemicals prior to their suspension in a treatment fluid for use in a subterranean formation. In some embodiments, the encapsulating material may be at least partially cured such that the gas-forming particulates or the gas-generating chemicals may be stored in a slurry. Because the encapsulating material is not fully cured, the gas-forming particulates or the gas-generating chemicals may clump or form agglomerated masses if stored in a dry state. The slurry may be used for storage so as to ensure that they remain separate and adequate for use after storage. The slurry may comprise the gas-forming particulates or the gas-generating chemicals coated in a partially cured encapsulating material and any compatible fluid. In other embodiments, the encapsulating material coating the gas-forming particulates or the gas-generating chemicals may be substantially or fully cured, such that they may be stored in a dry state. Such substantially or fully cured encapsulated gas-forming particulates or gas-generating chemicals may also be stored in a slurry.

In some embodiments, the gas-generating mechanism may be formed on-the-fly at the well site according to any of the embodiments described herein. As used herein, the term "on-the-fly" refers to performing an operation during a subterranean treatment that does not require stopping normal operations.

In some embodiments, the treatment fluids comprising the gas-generating mechanism described herein may be introduced into a subterranean formation at a rate and pressure sufficient to create or enhance at least one fracture therein. In such cases, the gas-forming particulates may be used to form proppant packs (or pillars, where the particulates are proppant aggregates) within the fracture(s). Where proppant aggregates are formed for use in the embodiments described herein, they may be formed by any means known to adhere individual proppant particulates together such that they form a coherent body that does not generally disperse without the application of shear. In some embodiments, the proppant aggregates may be formed by mixing proppant particulates with any of the binding agents disclosed herein so as to form coherent masses.

The treatment fluids for use in the embodiments described herein may include any treatment fluids suitable for use in a subterranean formation, provided that they do not interfere with the operation of the gas-generating mechanism (i.e., the gas-generating chemicals or the activators) disclosed herein. Suitable treatment fluids may include, but are not limited to, aqueous-based fluids; aqueous-miscible fluids; and any combination thereof. Suitable aqueous-based fluids may include fresh water; saltwater (e.g., water containing one or more salts dissolved therein); brine (e.g., saturated salt water); seawater; and any combination thereof. Suitable aqueous-miscible fluids may include, but not be limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); glycol ethers (e.g., ethyleneglycol monomethyl ether and ethyleneglycol monobutyl ether); polyglycol amines; polyols; any derivatives thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combinations thereof.

In some embodiments, the treatment fluids used in conjunction with the embodiments described herein may be gelled. Gelling the treatment fluid may synergistically operate with the gas-generating mechanism because the viscous gelled treatment fluid may provide improved suspension of the gas-forming particulates, while the gas-generating mechanism further increases the buoyancy of the gas-forming particulates within the treatment fluid. Moreover, a gelled treatment fluid may reduce fluid loss in the subterranean formation. The viscosity of the treatment fluid should not need to be increased to the extent as would be necessary if no gas-generating mechanism were present. Therefore, a much-reduced concentration of gelling agent and/or crosslinking agent may be used in the embodiments described herein as compared to traditional treatment fluids.

The treatment fluids may be gelled by a gelling agent and, optionally, a crosslinking agent. A variety of gelling agents may be used, including hydratable polymers that contain one or more functional groups such as hydroxyl, carboxyl, sulfate, sulfonate, amino, or amide groups. Suitable gelling agents typically comprise polymers; synthetic polymers; and any combinations thereof. A variety of gelling agents can be used in conjunction with the embodiments described herein include, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units including, but not limited to, galactose, mannose, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, carboxymethyl guar and cellulose derivatives, such as carboxylmethyl cellulose, hydroxyethyl cellulose. Additionally, synthetic polymers and copolymers that contain the above-mentioned functional groups may be used. Examples of such synthetic polymers include, but are not limited to, polyacrylate; polymethacrylate; polyacrylamide; polyvinyl alcohol; polyvinylpyrrolidone; and any combinations thereof. In other embodiments, the gelling agent molecule may be partially depolymerized. As used herein, the term "depolymerized," generally refers to a decrease in the molecular weight of the gelling agent molecule. Suitable gelling agents may be present in the treatment fluids described herein in an amount in the range of from a lower limit of about 0.1%, 0.5%, 1%, 1.5%, 2%, and 2.5% to an upper limit of about 5%, 4.5%, 4%, 3.5%, 3%, and 2.5% by weight of the treatment fluid alone. In preferred embodiments, the gelling agents may be present in the treatment fluids in an amount in the range of from about 0.01% to about 1% by weight of the treatment fluid alone.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers may include, but are not limited to, disodium octaborate tetrahydrate; sodium diborate; pentaborates; ulexite and colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. An example of a suitable commercially available zirconium-based crosslinker is CL-24™ available from Halliburton Energy Services, Inc. of Houston, Tex. An example of a suitable commercially available titanium-based crosslinker is CL-39™ available from Halliburton Energy Services, Inc. of Houston, Tex. Suitable crosslinkers generally are present in the treatment fluids described herein in an amount sufficient to provide, in situ, the desired degree of crosslinking between gelling agent molecules. In certain embodiments, the crosslinkers may be present in an amount in the range from a lower limit of about 0.001%, 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid alone. In other embodiments, the crosslinkers may be present in the treatment fluids in an amount in the range from about 0.01% to about 1% by weight of the treatment fluid alone. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids described herein may additionally include internal delayed gel breakers such as enzyme, oxidizer, acid buffer, or temperature-activated gel breakers. The gel breakers may revert the gelled or gelled and cross-linked treatment fluids to thin fluids that can be produced back to the surface after they have been used in a subterranean operation. The gel breaker may be present in the treatment fluid in an amount in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the gelling agent.

The treatment fluids may additionally comprise any additive suitable for use in subterranean operations provided that it does not interfere with the gas-generating mechanism described herein. Suitable additives may include, but are not limited to, a salt; a weighting agent; an inert solid; a fluid loss control agent; an emulsifier; a dispersion aid; a corrosion inhibitor; emulsion thinner; an emulsion thickener; a surfactant; a lost circulation material; a foaming agent; a pH control additive; a biocide; a stabilizer; a chelating agent; a scale inhibitor; a mutual solvent; an oxidizer; a reducer; a friction reducer; a foaming agent; a clay stabilizing agent; and any combinations thereof.

Particulates suitable for use in the embodiments described herein may be of any size and shape combination known in the art as suitable for use in a subterranean operation. Generally, where the chosen particulate is substantially spherical, suitable particulates have a size in the range of from about 2 to about 400 mesh, or even higher, U.S. Sieve Series. In some embodiments, the particulates have a size in the range of from about 8 to about 180 mesh, U.S. Sieve Series. In the embodiments described herein, there is no need for the particulates to be sieved or screened to a particular or specific particle mesh size or particular particle size distribution, but rather a wide or broad particle size distribution may be used.

In some embodiments, it may be desirable to use substantially non-spherical particulates. Suitable substantially non-spherical particulates may be cubic, polygonal, fibrous, or any other non-spherical shape. Such substantially non-spherical particulates may be, for example, cubic-shaped; rectangular-shaped; rod-shaped; ellipse-shaped; cone-shaped; pyramid-shaped; cylinder-shaped; and any combination thereof. That is, in embodiments wherein the particulates are substantially non-spherical, the aspect ratio may range such that the material is fibrous to such that it is cubic, octagonal, or any other configuration. Substantially non-spherical particulates may be sized such that the longest axis is from about 0.02 inches to about 0.3 inches in length. In other embodiments, the longest axis is from about 0.05 inches to about 0.2 inches in length. In one embodiment, the substantially non-spherical particulates are cylindrical having an aspect ratio of about 1.5 to 1 and about 0.08 inches in diameter and about 0.12 inches in length. In another embodiment, the substantially non-spherical particulates are cubic having sides about 0.08 inches in length. The use of substantially non-spherical particulates may be preferred in some embodiments because, among other things, they may provide a lower rate of settling in treatment fluids, which may act synergistically with the gas-generating mechanism described herein.

Particulates suitable for use in the embodiments described herein may comprise any material suitable for use in subterranean operations. Suitable materials include, but are not limited to, sand (e.g., beach sand, desert sand, or graded sand); bauxite; ceramic materials; glass materials (e.g., crushed, disposal glass material); polymer materials (e.g., EVA or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; lightweight particulates; microsphere plastic beads; ceramic microspheres; glass microspheres; manmade fibers; cements (e.g., Portland cements); fly ash; carbon black powder; and any combinations thereof. Suitable composite particulates may comprise a binding agent as described herein (e.g., the first or second binding agent) and a filler material wherein suitable filler materials include silica; alumina; fumed carbon; carbon black; graphite; mica; titanium dioxide; barite; meta-silicate; calcium silicate; kaolin; talc; zirconia; boron; fly ash; hollow glass microspheres; solid glass; and combinations thereof.

In some embodiments, degradable particulates may be used as a portion of the particulates forming the gas-forming particulates. In some embodiments, the degradable gas-forming particulates may be included in the treatment fluids in addition to the gas-forming particulates described herein so as to increase the conductivity of a subterranean formation. In some embodiments, the degradable particles used are oil-degradable materials, which degrade by produced fluids. In other embodiments, the degradable particulates may be degraded by materials purposely placed in the formation by injection or mixing the degradable particulates with delayed reaction degradation agents, or other suitable means to induce degradation.

Suitable degradable particulates include oil-degradable polymers. Suitable oil-degradable polymers that may be used in some embodiments described herein may be either natural or synthetic polymers. Some particular examples may include, but are not limited to, a polyacrylic; a polyamide; a polyolefin (e.g., polyethylene, polypropylene, polyisobutylene, and polystyrene); and combinations thereof. Other suitable oil-degradable polymers may include those that have a melting point which is such that the polymer will melt or dissolve at the temperature of the subterranean formation in which it is placed, such as a wax material.

In addition to oil-degradable polymers, other degradable particulates that may be used as the particulates forming the gas-forming particulates disclosed herein may include, but are not limited to, a degradable polymer; a dehydrated salt; and any combination thereof. As for degradable polymers, a polymer is considered to be "degradable" herein if the degradation is due to, in situ, a chemical and/or radical process such as hydrolysis or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on, at least, the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., formation temperature, presence of moisture, oxygen, microorganisms, enzymes, pH, and the like).

Suitable examples of degradable polymers may include, but are not limited to, a polysaccharide (e.g., dextran or cellulose); a chitin; a chitosan; a protein; an aliphatic polyester; a poly(lactide); a poly(glycolide); a poly($\epsilon$-caprolactone); a poly(hydroxybutyrate); a poly(anhydride); an aliphatic polycarbonate; an aromatic polycarbonate; a poly(orthoester); a poly(amino acid); a poly(ethylene oxide); a polyphosphazenes; and any combinations thereof. Of these suitable polymers, aliphatic polyesters and polyanhydrides may be preferred. Polyanhydride hydrolysis proceeds, in situ, via free carboxylic acid chain-ends to yield carboxylic acids as final degradation products. The degradation time can be varied over a broad range by changes in the polymer backbone. Examples of suitable polyanhydrides include, but are not limited to, a poly(adipic anhydride); a poly(suberic anhydride); a poly(sebacic anhydride); and a poly(dodecanedioic anhydride). Other suitable examples include, but are not limited to, a poly(maleic anhydride) and a poly(benzoic anhydride).

Dehydrated salts may be used in some embodiments as degradable particulates. A dehydrated salt is suitable for use in some embodiments described herein will degrade over time as it hydrates. For example, an anhydrous borate material that degrades over time may be suitable. Specific examples of particulate solid anhydrous borate materials that may be used include, but are not limited to, an anhydrous sodium tetraborate (also known as anhydrous borax) and an anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous-based treatment fluids described herein. In some instances, the total time required for the anhydrous borate materials to degrade in an aqueous-based treatment fluid is in the range of from about 8 hours to about 72 hours depending upon the temperature of the subterranean zone in which they are placed. Other examples include organic or inorganic salts like acetate trihydrate.

Blends of certain degradable materials may also be suitable as degradable particulates. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with the gas-generating mechanism described herein, the conductivity of any proppant packs or proppant pillars, the production of any of the fluids from the subterranean formation, and the like.

In some embodiments, the degradable particulates are present in the range of from a lower limit of about 1%, 2.5%, 5%, 7.5%, 10%, 12.5%, 15%, 17.5%, and 20% to an upper limit of about 40%, 37.5%, 35%, 32.5%, 30%, 27.5%, 25%, 22.5%, and 20% by weight of the total particulates introduced into the treatment fluid. In other embodiments, the degradable particulates are present in the range from about 5% to about 20% by weight of the total particulates introduced into a treatment fluid.

In some embodiments, the gas-forming proppant particulates are coated with a binding agent that holds or contains a gas-generating agent and/or an activator. Any binding agent suitable for use in a subterranean formation may be used in the embodiments described herein. The binding agents may exhibit a sticky or tacky character. As used herein, the term "tacky," in all of its forms, generally refers to a substance having a nature such that it is (or may be activated to become) somewhat sticky to the touch. Among other things, the binding agent is used to coat particulates and/or an encapsulating material contained on the particulates so as to form a tacky surface on the particulates or encapsulating material such that the gas-generating chemical and/or activator may attach thereto. In some embodiments, the tacky nature of the binding agents may later become non-tacky after the gas-generating chemical or activator is adhered thereto. In some embodiments, the binding agent may be designed such that the activators described in the embodiments herein may diffuse therethrough and contact the gas-generating chemical. Additionally, the binding agent may be used to form proppant aggregates from individual proppant particulates.

Suitable binding agents for use in the embodiments described herein may include, but are not limited to, non-aqueous tackifying agents; aqueous tackifying agents; silyl-modified polyamide compounds; zeta-potential modifying agents; curable resins; silicon-based resins; and any combination thereof. The type and amount of binding agent included in a particular method of the embodiments described herein may depend upon, among other factors, the type and size of particulates used, the composition and/or temperature of the subterranean formation, the chemical composition of treatment fluid, the flow rate of fluid present in the formation, the effective porosity and/or permeability of the subterranean formation, pore throat size and distribution, and the like. The concentration of the binding agent can be varied, inter alia, to either enhance bridging to provide for a more rapid coating of the binding fluid (e.g., onto the proppant particulates or aggregates) or to minimize bridging to allow deeper penetration into the subterranean formation. The concentration of the binding agent may also be varied based on the mechanism with which the gas-generating chemical and the activator are designed to react, as discussed above. It is within the ability of one skilled in the art, with the benefit of this disclosure, to determine the type and amount of binding fluid to include to achieve the desired results.

In some embodiments, the binding agent may comprise a non-aqueous tackifying agent. A particularly preferred group of non-aqueous tackifying agents comprises polyamides that are liquids or in solution at the temperature of the subterranean formation such that they are, by themselves, nonhardening when introduced into the subterranean formation. A particularly preferred product is a condensation reaction product comprised of a polyacid and a polyamine. Such products include compounds such as combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well.

Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Aqueous tackifying agents suitable for use in the embodiments herein are usually not generally significantly tacky when placed onto a particulate, but are capable of being "activated" (e.g., destabilized, coalesced and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water.

Suitable aqueous tackifying agents include any polymer that can bind, coagulate, or flocculate a particulate. Also, polymers that function as pressure-sensitive adhesives may be suitable. Examples of aqueous tackifying agents suitable for use in the embodiments herein may include, but are not limited to, acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers; derivatives thereof, and combinations thereof.

Some suitable tackifying agents may comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers may include, but are not limited to, dialkylamino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Silyl-modified polyamide compounds may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments, the binding agent may comprise an aggregating composition, which can modify the zeta potential or aggregation potential of a particulate. Such modifications can permit any two surfaces to have a greater attraction for one another.

Aggregating compositions suitable for use in the embodiments herein may include, but are not limited to, a reaction product of an amine and a phosphate ester, where the aggregating composition is designed to coat a surface with the reaction product to change the zeta potential or aggregation potential of the surface. Suitable amines may include, but are not limited to, any amine that is capable of reacting with a suitable phosphate ester to form a composition that forms a deformable coating on a surface. Examples of such amines may include, but are not limited to, any amine of the general formula $R_1,R_2NH$ or mixtures or combinations thereof, where $R_1$ and $R_2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in the embodiments described herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters may include, but are not limited to, any phosphate ester that is capable of reacting with a suitable amine to form a composition that forms a deformable coating on a surface. Examples of such phosphate esters may include, but are not limited to, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Examples of phosphate esters may include, but are not limited to, phosphate ester of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxylphosphate or higher alkoxy phosphates or mixtures or combinations thereof. Other examples of phosphate esters may include, but are not limited to, phosphate esters of alkanol amines having the general formula $N[R^7OP(O)(OH)_2]_3$ where $R^7$ is a carbenzyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol-amine or mixtures or combinations thereof. Other examples of phosphate esters may include, but are not limited to, phosphate esters of hydroxylated aromatics such as phosphate esters of alkylated phenols such as nonylphenyl phosphate ester or phenolic phosphate esters. Other examples of phosphate esters may include, but are not limited to, phosphate esters of diols and polyols such as phosphate esters of ethylene glycol, propylene glycol, or higher glycolic structures. Other phosphate esters may include, but are not limited to, any phosphate ester than can react with an amine and coated on to a substrate forms a deformable coating enhancing the aggregating potential of the substrate.

Curable resins suitable for use in the embodiments described herein as a binding agent may include all resins known in the art that are capable of forming a hardened, consolidated mass. Many such curable resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, silicon-based resins, and mixtures thereof. Some suitable curable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resin if the cure temperature is low (i.e., less than 250° F.), but will cure under the effect of time and temperature if the temperature is above about 250° F., preferably above about 300° F. It is within the ability of one skilled in the art, with the benefit of this disclosure, to select a suitable resin for use in embodiments described herein and to determine whether a catalyst is required to trigger curing. By way of example, a silicon-based resin system may be used as a more eco-friendly choice in cases where epoxy or furan-based resins pose environmental concerns.

Any solvent that is compatible with the resin and achieves the desired viscosity effect is suitable for use in the embodiments described herein. Preferred solvents include those listed above in connection with tackifying compounds. It is within the ability of one skilled in the art, with the benefit of this disclosure, to determine whether and how much solvent is needed to achieve a suitable viscosity.

Suitable silicon-based resins for use as the binding agents in some embodiments described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and has a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments herein may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins may include:

(a) a compound comprising a reactive group of formula (I):

$$—X—SiR''_x(OR')_{3-z} \qquad (I)$$

wherein X comprises a hydrocarbon chain; wherein x=0 to 2 and z=0 to 2; wherein R' and R" comprises hydrogen, a halogen, an amide, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different; and, (b) a polysiloxane comprising a reactive functional group that comprises at least one of the following structural units (II):

$$R^1_n R^2_m SiO_{(4-n-m)/2} \qquad (II)$$

wherein $R^1$ comprises hydrogen, hydroxyl, a hydrocarbon chain, or a siloxane chain; wherein $R^2$ comprises a functional group; and wherein m and n fulfill the requirements of 0≤n<4, 0≤m<4 and 2<(m+n)<4; and wherein when n>1, then each R' may be the same or different; and wherein when m>1, then each $R^2$ may be the same or different. In certain embodiments, the functional group of $R^2$ comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include (a) a compound comprising an organofunctional polysiloxane polymer as a binding resin obtaining the polymeric structure as part of a curing mechanism or a combination thereof. The curing mechanism of such siloxane coatings is a two step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the formula (III):

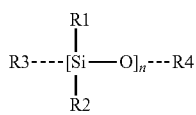

wherein, for each repeating polymer unit, $R^1$, $R^2$ and $R^3$ are independently selected from the group consisting of alkyl, aryl, reactive glycidoxy groups having up to 20 carbon atoms, and $OSi(OR5)_3$ groups, wherein each R5 independently has the same meaning as R1, R2 or R3, and R4 and is either alkyl, aryl or hydrogen, and wherein n is selected so as that the molecular weight of the polysiloxane is in the range of 500 to 2000; and, b) an organo functional silane with two hydrolysable groups having the formula (IV):

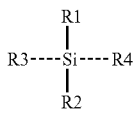

wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used, examples of suitable polymers may include, but are not limited to, polyalkyls, such as polyethers, polyalkanes, polyalkenes, and polyalkynes; substituted alkyl monomers, such as styrene; acrylics; and combinations thereof. Examples of suitable reactive silicon end groups may include, but are not limited to, triethoxysilanes, methyldiethoxysilanes, trisilanols, alkoxysilanes, substituted silanes, multi-silanols, and combinations thereof. One suitable polymer having a reactive silicon end group that may be used in particular embodiments herein is a silane-modified poly(propylene oxide) oligomer.

Generally, any suitable silane coupling agent may be used in accordance with particular embodiments described herein. Examples of suitable silane coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyl-trimethoxysilanes; vinyltrichlorosilane; vinyltris(beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylm-ethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltris(beta-methoxyethoxy) silane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-[3-(trimethoxysilyl)propyl]-ethylenediamine; substituted silanes where one or more of the substitutions contains a different functional group; and combinations thereof.

In some embodiments, the binding agent may also comprise an optional catalyst to facilitate the curing of the adhesive composition. Generally, any suitable catalyst may be used with the binding agents described herein. Examples of suitable catalysts may include, but are not limited to, tertiary amine catalysts, titanium chelate catalysts, tin catalysts, lead catalysts, bismuth catalysts, and combinations thereof. One suitable catalyst that may be used in particular embodiments disclosed herein is tin, dibutylbis(2,4-pentanedionate-O, O')—, (OC-6-11)-. In some embodiments, the catalyst may be present in the binding agent in the range of from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the binding agent.

In some embodiments, the gas-forming particulates are encapsulated in an encapsulating material (i.e., the first or second encapsulating material). The encapsulating material may form a barrier, either a permanent barrier or a time-dependent barrier, to prevent or delay reaction of the gas-generating chemical and the activator. The encapsulating material may also allow storage of the gas-forming particulates prior to their use in a treatment fluid in a subterranean operation. Suitable encapsulating material for use in preparing the gas-generating mechanism described herein include, but are not limited to, a wax; a drying oil (e.g., tung oil, linseed oil, and the like); a polyurethane; a cross-linked partially hydrolyzed polyacrylic; and any combinations thereof. By way of example, a wax encapsulating material may release in the presence of sufficient temperature to melt the wax coating. Additionally, any of the binding agents described herein may be used as the encapsulating material provided that the tacky nature of the binding material does not interfere with the function of the encapsulating material. In some embodiments, the encapsulating material may form a porous coating on the gas-forming particulates such that the activator may diffuse slowly therethrough. In other embodiments, the encapsulating material may be capable of degrading under certain conditions (e.g., under down hole temperatures).

The gas-generating chemical for use in conjunction with the embodiments disclosed herein may be any chemical capable of producing gas in a subterranean formation when reacted with an activator. One of ordinary skill in the art, with the benefit of this disclosure, will recognize what combination of gas-generating chemical(s) and activator(s) is desirable to achieve the gas generation and particulate density reduction described herein. Such factors that may affect the combination of gas-generating chemical(s) and activator(s) may include, but is not limited to, the type of gas desired, the chemistry of the gas-generating chemical and the activator, the conditions of the subterranean formation (e.g., temperature), and the like.

In some embodiments, the gas-generating chemical may generate ammonia, hydrogen, nitrogen, carbon dioxide, carbon monoxide, a hydrocarbon gas, and the like. In some embodiments, the gas-generating chemical produces nitrogen. In other embodiments, the gas-generating chemical produces nitrogen and ammonia, wherein the amount of nitrogen is greater than the amount of ammonia. In still other embodiments, the gas-generating chemical produces hydrogen. In some embodiments, it may be preferably that the gas generated by the gas-generating chemical is insoluble in aqueous and/or organic media. In other embodiments, the gas-generating chemical may generate carbon dioxide.

Suitable nitrogen producing gas-generating chemicals for use in the embodiments described herein may include, but are not limited to, an organic azo-based compound; an organic hydrazide-based compound; hydrazine; an alkyl substituted hydrazine; an aryl substituted hydrazine; a hydroxylamine compound; an inorganic ammonium salt; and any combinations thereof. Examples of suitable organic azo-based and organic hydrazide-based compounds may include, but are not limited to, azodicarbonamide; azobis(isobutyronitrile); p-toluene sulfonyl hydrazide; p-toluene sulfonyl semicarbazide; carbohydrazide; p-p' oxybis(benzenesulfonylhydrazide); benzene sulfonyl hydrazide; and any combination thereof. Of these, azodicarbonamide and carbohydrazide are preferred. Nitrogen producing gas-generating chemicals that do not contain an organic azo-based or an organic hydrazide-based compound may also be used in the embodiments described herein including, but not limited to, an ammonium salt; an ammonium salt of nitrous acid (e.g., ammonium nitrite and zinc diammonium nitrite); hydroxylamine sulfate; carbamide (urea); and any combinations thereof. Oil soluble nitrogen gas-generating chemicals may be preferred including, but not limited to, p-toluene sulfonyl hydrazide; p-toluene sulfonyl semicarbazide; diphenyl carbazide; benzene sulfonyl hydrazide; p,p'-oxybisbenzenesulfonyl hydrazide; and any combination thereof. Suitable carbon dioxide producing gas-generating chemicals may include, but are not limited to, a carbonate salt of an ammonium ion; a bicarbonate salt of an ammonium ion; an alkali metal; an alkaline earth metal; a transition metal; and any combinations thereof. Suitable examples of hydrogen gas-generating materials may include, but are not limited to, aluminum metal; zinc metal; magnesium metal; iron metal; tin metal; and any combinations thereof. In some embodiments, the gas-generating chemical, regardless of the type of gas it may generate, may be soluble in the binding agent and/or in the encapsulating material of the embodiments described herein. In other embodiments, the gas-generating chemical, regardless of the type of gas it may generate, may be insoluble in the binding agent and/or in the encapsulating material of the embodiments described herein.

Suitable activators for use when the gas-generating chemical is an organic azo-based compound, an organic hydrazide-based compound, a hydroxylamine compound, or any combination thereof may include, but are not limited to, an oxidizing agent; a high pH compound (e.g., having a pH of greater than about 10); and any combinations thereof. Oxidizing agents of alkali metal- and alkaline metal-containing materials may include, but are not limited to, ammonium persulfate; sodium persulfate; potassium persulfate; sodium chlorate; sodium chlorite; sodium perborate; sodium peroxy carbonate; sodium bromate; sodium peroxide; sodium hypochlorite; sodium hypobromite; calcium hypochlorite; magnesium peroxide; calcium peroxide; sodium peroxide; and any combinations thereof. Other suitable oxidizing agents may be non-salts including, but not limited to, hydrogen peroxide; an organic peroxyacid; and any combinations thereof. Suitable high pH compounds may include, but are not limited to, a hydroxide of an alkali metal; a hydroxide of an alkaline earth metal; and any combinations thereof. Specific high pH compounds may include, but are not limited to, sodium hydroxide; potassium hydroxide; an alkali metal silicate; and any combinations thereof.

In some embodiments, the gas-generating chemical is a fuel and the activator is an oxidizing agent. Suitable fuels for use as the gas-generating chemical may include, but are not limited to, a guanidine compound (e.g., guanidine nitrate, nitroguanidine, and guanylurea dinitramide); a tetrazole compound (e.g., 5-aminotetrazole and bitetrazole ammonium salt); a triazine compound (e.g., melamine, melamine cyanurate, melamine nitrate, melamine perchlorate, trihydrazinotriazine); a nitrocompound of melamine; a purine compound (e.g., 8-azaguanine); an amino-acid derivative (e.g., glycine derivatives); and any combination thereof. Suitable oxidizing agents for use as the activator with the fuels used as the gas-generating chemicals in some embodiments described herein may include, but are not limited to, a copper carbonate; a nitrate; a metal nitrate; a metal perchlorate; an ammonium perchlorate; a metal chlorate; and any combination thereof. Metals that may be used in forming the oxidizing agents may include, but are not limited to, alkali metals; alkali earth metals; and any combination thereof. Examples of suitable metals for use in forming the oxidizing agents may include, but are not limited to, copper; cobalt; zinc; manganese; ammonium; iron; molybdenum; bismuth; cerium; potassium; sodium; strontium; and any combination thereof. In preferred embodiments, the oxidizing agent is copper nitrate, a potassium nitrate, a sodium nitrate, or a strontium nitrate.

In other embodiments, the gas-generating chemical may be a polymeric nanoparticle, such as a polyester, comprising carbonate side chains and the activator may be water (e.g., the aqueous base fluid). Such gas-generating chemicals comprising the polymeric nanoparticle with carbonate side chains by undergo hydrolysis with the water activator, resulting in the formation of carbon dioxide.

The activators described herein are capable of causing, or "activating," the gas-generating chemical so as to generate gas. In some instances, a activator may be capable of activating the gas-generating chemical upon encountering multiple stimuli. In some embodiments, the activators may be present in a range of from a lower limit of about 0.01%, 1%, 2.5%, 5%, 7.5%, 10%, and 12.5% to an upper limit of about 25%, 22.5%, 20%, 17.5%, 15%, and 12.5% by weight of the gas-generating chemical. In preferred embodiments, the activators may be present in a range from about 1% to about 10% by weight of the gas-generating chemical.

In various embodiments, systems configured for delivering the treatment fluids described herein to a down hole location are described. In various embodiments, the systems can comprise a pump fluidly coupled to a tubular, the tubular containing the polymerizable aqueous consolidation compositions and/or the water-soluble polymerization/curable initiator compositions, and any additional additives, disclosed herein.

The pump may be a high pressure pump in some embodiments. As used herein, the term "high pressure pump" will refer to a pump that is capable of delivering a fluid down hole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery down hole.

FIG. 1 shows an illustrative schematic of a system that can deliver treatment fluids of the embodiments disclosed herein to a down hole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various down hole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, down hole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, down hole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a treatment fluid comprising an activator; providing gas-forming particulates comprising: coating particulates with a binding agent, wherein the binding agent holds a gas-generating chemical onto the particulates; suspending the gas-forming particulates in the treatment fluid; introducing the treatment fluid comprising the gas-forming particulates into a subterranean formation; and reacting the gas-generating chemical and the activator so as to generate gas-formed particulates.

B. A method comprising: providing a treatment fluid comprising an activator; providing gas-forming particulates comprising: coating particulates with a binding agent, wherein the binding agent holds a gas-generating chemical onto the particulates, and encapsulating the gas-forming particulates with an encapsulating material; suspending the gas-forming particulates encapsulated with the encapsulating material in the treatment fluid, introducing the treatment fluid comprising the gas-forming particulates encapsulated with the encapsulating material into a subterranean formation; and reacting the gas-generating chemical and the activator so as to generate gas-formed particulates.

C. A method comprising: providing gas-forming particulates comprising: coating particulates with a first binding agent wherein the first binding agent holds a gas-generating chemical onto the particulates; encapsulating the gas-forming particulates with a first encapsulating material; coating the first encapsulating material with a second binding agent, wherein the second binding agent holds an activator onto the first encapsulating material encapsulating the gas-forming particulates; suspending the gas-forming particulates encapsulated with the first encapsulating material and coated with the second binding agent in the treatment fluid; and reacting the gas-generating chemical and the activator so as to generate gas-formed particulates.

Each of embodiments A, B, and C may have one or more of the following additional elements in any combination:

Element 1: Wherein the density of the gas-forming particulates is greater than the density of the gas-formed particulates.

Element 2: Wherein the density of the gas-formed particulates is in the range of about 5% to about 90% less than the density of the gas-forming particulates.

Element 3: Wherein the gas-generating chemical is contained within the binding agent prior to the step of: coating particulates with a binding agent.

Element 4: Wherein the step of: reacting the gas-generating chemical and the activator so as to generate gas-formed particulates is achieved by exposing the gas-generating chemical to the activator through the binding agent.

Element 5: Wherein the gas-generating chemical is encapsulated in an encapsulating material.

Element 6: Wherein the step of: reacting the gas-generating chemical and the activator so as to generate gas-formed particulates is achieved by: exposing the gas-generating chemical to the activator through the encapsulating material, or exposing the gas-generating chemical to the activator through the encapsulating material and through the binding agent.

Element 7: Wherein the encapsulating material is at least partially cured and the gas-forming particulates encapsulated in the encapsulating material are stored in a slurry prior to the step of: suspending the gas-forming particulates encapsulated with the encapsulating material in the treatment fluid, or wherein the encapsulating material is substantially cured and the gas-forming particulates encapsulated in the encapsulating material are stored in a dry state prior to the step of: suspending the gas-forming particulates encapsulated with the encapsulating material in the treatment fluid.

Element 8: Wherein the step of: reacting the gas-generating chemical and the activator so as to generate gas-formed particulates is achieved by: exposing the gas-generating chemical to the activator through the second binding agent and through the first encapsulating material, or exposing the gas-generating chemical to the activator through the second binding agent, through the first encapsulating material, and through the first binding agent.

Element 9: Wherein the activator is contained within the second binding agent prior to the step of: coating the first encapsulating material with a second binding agent.

Element 10: Wherein the gas-forming particulates encapsulated with the first encapsulating material and coated with the second binding agent are further encapsulated with a second encapsulating material.

Element 11: Wherein the second encapsulating material is at least partially cured and the gas-forming particulates encapsulated in the first encapsulating material, coated with the second binding agent, and encapsulated with the second encapsulating material are stored in a slurry prior to the step of: suspending the gas-forming particulates encapsulated with the first encapsulating material and coated with the second binding agent in the treatment fluid, or wherein the encapsulating material is substantially cured and the gas-forming particulates encapsulated in the first encapsulating material, coated with the second binding agent, and encapsulated with the second encapsulating material are stored in a dry state prior to the step of: suspending the gas-forming particulates encapsulated with the first encapsulating material and coated with the second binding agent in the treatment fluid.

By way of non-limiting example, exemplary combinations applicable to A, B, C include: A with 1, 4, and 5; B with 2, 3, 6, and 7; C with 1, 2, and 10.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing gas-forming particulates comprising:
       coating particulates with a first binding agent
           wherein the first binding agent holds a gas-generating chemical onto the particulates;
       coating the gas-forming particulates with a first encapsulating material;
       coating the first encapsulating material with a second binding agent,
           wherein the second binding agent holds an activator onto the first encapsulating material;
   suspending in a treatment fluid the gas-forming particulates coated first with the first encapsulating material and coated second with the second binding agent; and
   reacting the gas-generating chemical and the activator so as to generate gas-formed particulates.

2. The method of claim 1, wherein the step of: reacting the gas-generating chemical and the activator so as to generate gas-formed particulates is achieved by: exposing the gas-generating chemical to the activator through the second binding agent and through the first encapsulating material, or
   exposing the gas-generating chemical to the activator through the second binding agent, through the first encapsulating material, and through the first binding agent.

3. The method of claim 1, wherein the density of the gas-forming particulates is greater than the density of the gas-formed particulates.

4. The method of claim 1, wherein the gas-generating chemical is contained within the first binding agent prior to the step of: coating particulates with a first binding agent.

5. The method of claim 1, wherein the activator is contained within the second binding agent prior to the step of: coating the first encapsulating material with a second binding agent.

6. The method of claim 1, wherein the gas-forming particulates coated first with the first encapsulating material and coated second with the second binding agent are further coated third with a second encapsulating material.

7. The method of claim 6, wherein the second encapsulating material is at least partially cured and the gas-forming particulates coated first in the first encapsulating material, coated second with the second binding agent, and coated third with the second encapsulating material are stored in a slurry prior to the step of: suspending the gas-forming particulates coated first with the first encapsulating material and coated second with the second binding agent in the treatment fluid, or
   wherein the second encapsulating material is substantially cured and the gas-forming particulates coated first in the first encapsulating material, coated second with the second binding agent, and coated third with the second encapsulating material are stored in a dry state prior to the step of: suspending the gas-forming particulates coated first with the first encapsulating material and coated second with the second binding agent in the treatment fluid.

8. The method of claim 6, wherein the gas-generating chemical is coated in a third encapsulating material.

9. The method of claim 1, wherein a portion of the particulates are degradable particulates.

10. The method of claim 1, wherein the activator is present in an amount of about 0.01% to about 25% by weight of the gas-generating chemical.

11. The method of claim 1, wherein the first binding agent and/or the second binding agent further comprises a catalyst.

12. A method comprising:
  providing gas-forming particulates comprising:
    coating particulates with a first binding agent
      wherein the first binding agent holds an encapsulated gas-generating chemical onto the particulates;
    coating the gas-forming particulates with a first encapsulating material;
    coating the first encapsulating material with a second binding agent,
      wherein the second binding agent holds an activator onto the first encapsulating material, and
      wherein the activator is present in an amount of about 0.01% to about 25% by weight of the gas-generating chemical;
  suspending in a treatment fluid the gas-forming particulates coated first with the first encapsulating material and coated second with the second binding agent; and
  reacting the gas-generating chemical and the activator so as to generate gas-formed particulates.

13. The method of claim 12, wherein the step of: reacting the gas-generating chemical and the activator so as to generate gas-formed particulates is achieved by: exposing the gas-generating chemical to the activator through the encapsulation of the encapsulated gas-generating chemical, through second binding agent, and through the first encapsulating material, or
  exposing the gas-generating chemical to the activator through the encapsulation of the encapsulated gas-generating chemical, through the second binding agent, through the first encapsulating material, and through the first binding agent.

14. The method of claim 12, wherein the density of the gas-forming particulates is greater than the density of the gas-formed particulates.

15. The method of claim 12, wherein the encapsulated gas-generating chemical is contained within the first binding agent prior to the step of: coating particulates with a first binding agent.

16. The method of claim 12, wherein the activator is contained within the second binding agent prior to the step of: coating the first encapsulating material with a second binding agent.

17. The method of claim 12, wherein the gas-forming particulates coated first with the first encapsulating material and coated second with the second binding agent are further coated third with a second encapsulating material.

18. The method of claim 17, wherein the second encapsulating material is substantially cured and the gas-forming particulates coated first in the first encapsulating material, coated second with the second binding agent, and coated third with the second encapsulating material are stored in a dry state prior to the step of: suspending the gas-forming particulates coated first with the first encapsulating material and coated second with the second binding agent in the treatment fluid.

19. The method of claim 12, wherein a portion of the particulates are degradable particulates.

\* \* \* \* \*